United States Patent [19]
Morris

[11] 3,988,041
[45] Oct. 26, 1976

[54] APPARATUS FOR PREVENTING RELEASE OF AN EMERGENCY BRAKE APPLICATION PRIOR TO A COMPLETE STOP OF THE TRAIN

[75] Inventor: Robert B. Morris, North Huntingdon, Pa.

[73] Assignee: Westinghouse Air Brake Company, Wilmerding, Pa.

[22] Filed: Oct. 23, 1975

[21] Appl. No.: 624,758

[52] U.S. Cl. ................. 303/21 R; 188/181 R; 303/81; 303/86
[51] Int. Cl.² ............... B60T 8/02; B60T 15/02
[58] Field of Search ........... 303/2, 3, 1, 21 R, 21 A, 303/13, 33, 68, 81, 69, 86, 70; 188/181, 180; 180/77 R, 82 R, 105 R; 73/488

[56] References Cited
UNITED STATES PATENTS

| | | | |
|---|---|---|---|
| 3,136,587 | 6/1964 | May | 303/21 R X |
| 3,468,585 | 9/1969 | Wilson | 303/86 X |
| 3,761,137 | 9/1973 | Green et al. | 303/3 |
| 3,823,984 | 7/1974 | Parfitt et al. | 303/3 |

FOREIGN PATENTS OR APPLICATIONS

| | | | |
|---|---|---|---|
| 1,288,888 | 9/1972 | United Kingdom | 303/81 |

*Primary Examiner*—Trygve M. Blix
*Assistant Examiner*—Douglas C. Butler
*Attorney, Agent, or Firm*—W. F. Poore; R. W. McIntire, Jr.

[57] ABSTRACT

Apparatus on each vehicle in a train, for effecting a release of an emergency brake application upon a complete stop of the train, comprises a fluid pressure operated brake pipe vent valve device that is supplied with fluid under pressure from a quick action chamber when the emergency brake application is effected, a release valve device operable upon the release of fluid under pressure therefrom to vent fluid under pressure from the brake pipe vent valve device to atmosphere to cause closing of the brake pipe vent valve thereby enabling recharging of the brake pipe to effect a release of the prior emergency brake application, and a speed responsive device for supplying fluid to the release valve device at a pressure proportional to the speed of the train. Accordingly, upon a complete stop of the train, the release valve device is no longer supplied with fluid under pressure whereupon this valve device releases fluid under pressure from the brake pipe vent valve device thereby allowing a spring to close the brake pipe vent valve after which the brake pipe can be charged and the brakes released.

12 Claims, 2 Drawing Figures

APPARATUS FOR PREVENTING RELEASE OF AN EMERGENCY BRAKE APPLICATION PRIOR TO A COMPLETE STOP OF THE TRAIN

BACKGROUND OF THE INVENTION

In most fluid pressure controlled railway vehicle brake apparatus presently used by American railroads, the time between the initiation of an emergency brake application on a train and a subsequent release of this brake application is determined by the release of fluid under pressure from a charged reservoir of a chosen volume to atmosphere via a choke or restriction of a chosen size. It is apparent that the time required to bring a train to a complete stop subsequent to effecting an emergency brake application increases as both the speed and also the weight or length of the train increases. Accordingly, the volume of the reservoir and the size of the choke that would provide for the stopping of a slow speed, short train prior to effecting a release of an emergency brake application would not insure the stopping of a high speed long train prior to effecting a release of an emergency brake application.

Accordingly, it is the general purpose of this invention to provide a brake apparatus for railway vehicles wherein the release of an emergency brake application is effected upon a complete stop of the train.

SUMMARY OF THE INVENTION

According to the present invention, there is provided a railway vehicle brake apparatus that comprises an emergency valve device which includes a brake pipe vent valve operated by a piston supplied with fluid under pressure from a charged quick action chamber or volume within the emergency valve device, a fluid pressure operated release valve device operable upon the release of fluid under pressure therefrom to establish a communication between the brake pipe vent valve piston and atmosphere, and a speed responsive mechanism for supplying fluid to the fluid pressure operated valve device at a pressure that is proportional to the speed of the vehicle thereby enabling reclosing of the brake pipe vent valve and a release of the brake application upon a complete stop of the vehicle.

DESCRIPTION

Figure 1:
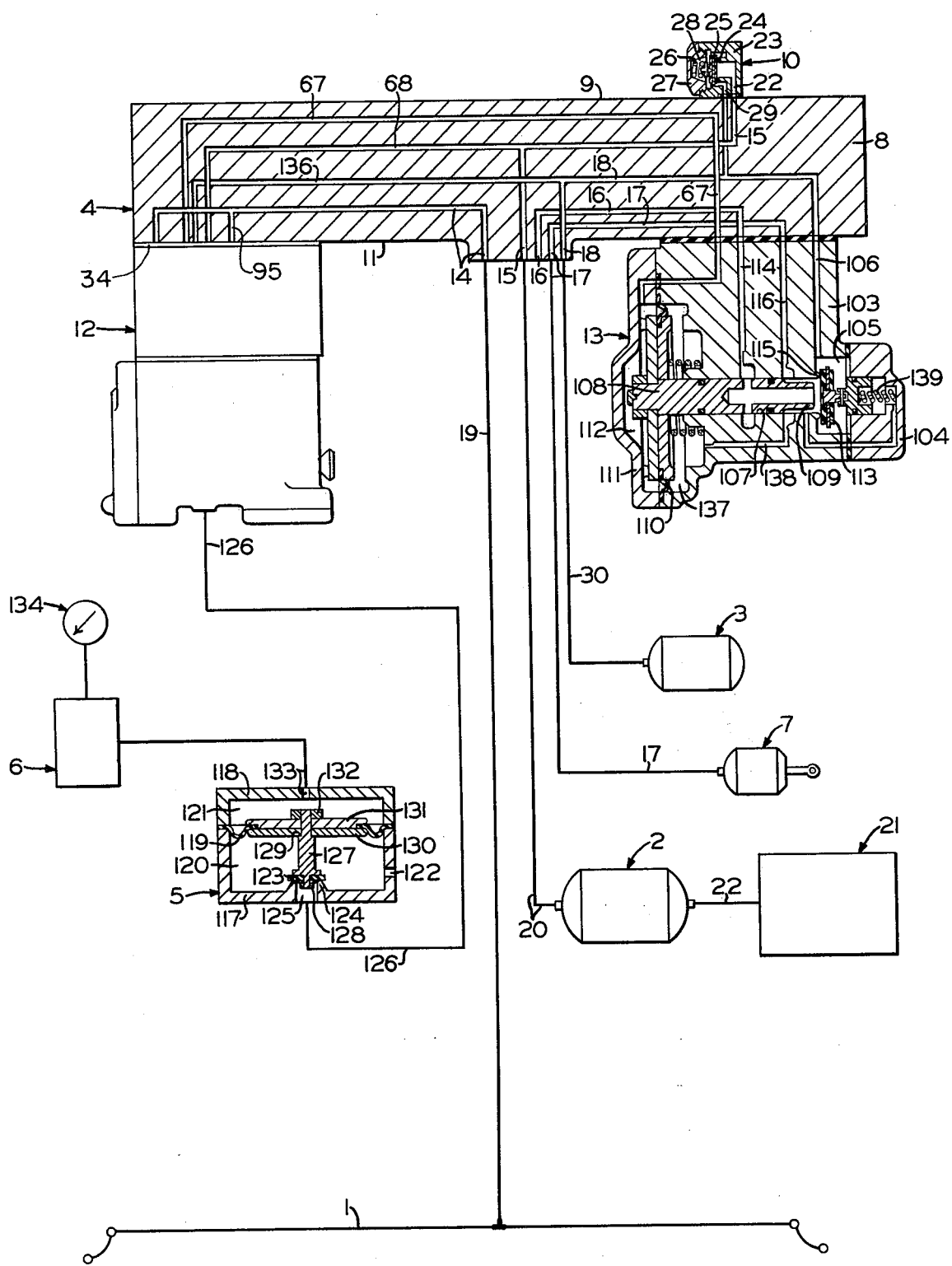
FIG. 1 is a diagrammatic view of a fluid pressure controlled railway vehicle brake apparatus embodying the invention.

Referring to the drawing, a fluid pressure controlled railway vehicle brake apparatus embodying the invention comprises a brake pipe 1 that extends from end to end of the vehicle and through each of the other vehicles in a train, a main reservoir 2, a supply reservoir 3, an operating unit 4, a fluid pressure operated release valve device 5, a fluidic speedometer 6, and a brake cylinder 7.

The operating unit 4 comprises a pipe bracket 8 that has an upper face 9 to which a check valve device 10 is secured by any suitable means (not shown) and a lower face 11 to which an emergency valve device 12 and a relay valve device 13 are secured in spaced-apart relationship by any suitable means (not shown).

Extending from the lower face 11 through the pipe bracket 8 are five ports and corresponding passageways 14, 15, 16, 17 and 18 which open at the upper face 9 and the lower face 11 of the pipe bracket 8, as described below.

Connected to the port 14 is one end of a branch pipe 19 that has its opposite end connected to the hereinbefore-mentioned brake pipe 1 intermediate the ends thereof.

Connected to the port 15 is one end of a pipe 20 that has its opposite end connected to the above-mentioned main reservoir 2 which is charged with fluid under pressure from such as a fluid compressor 21 via a pipe 22.

The passageway corresponding to the port 15 extends through the pipe bracket 8 to the upper face 9 where it registers with one end of a passageway 22 formed in a body 23 of the check valve device 10.

As shown in FIG. 1 of the drawings, the passageway 22 extends through the body 23 and has formed at its other end an annular valve seat 24 against which a flat disc valve 25 is normally biased by a spring 26 interposed between this valve 25 and a cup nut 27 that has screw-threaded engagement with corresponding internal screw threads provided therefor in the body 23.

The cap nut 27 cooperates with the body 23 to form on the left-hand side of the valve 25 a chamber 28 into which opens one end of a passageway 29 in the body 23 of the check valve device 10. The other end of this passageway 29 registers with that end of the passageway extending from the port 18 through the pipe bracket 8 to the upper face 9 thereof, this passageway in the pipe bracket 8 being denoted on FIG. 1 by the reference numeral 18.

A pipe 30 that has one end connected to the port 18 has its opposite end connected to the hereinbefore-mentioned supply reservoir 3. Consequently, fluid under pressure can flow from the main reservoir 2 to the supply reservoir 3 via pipe 20, port and passageway 15, passageway 22, past valve 25, chamber 28, passageway 29, passageway and port 18 and pipe 30 until the supply reservoir 3 is charged to substantially the same pressure as the main reservoir 2.

Figure 2:
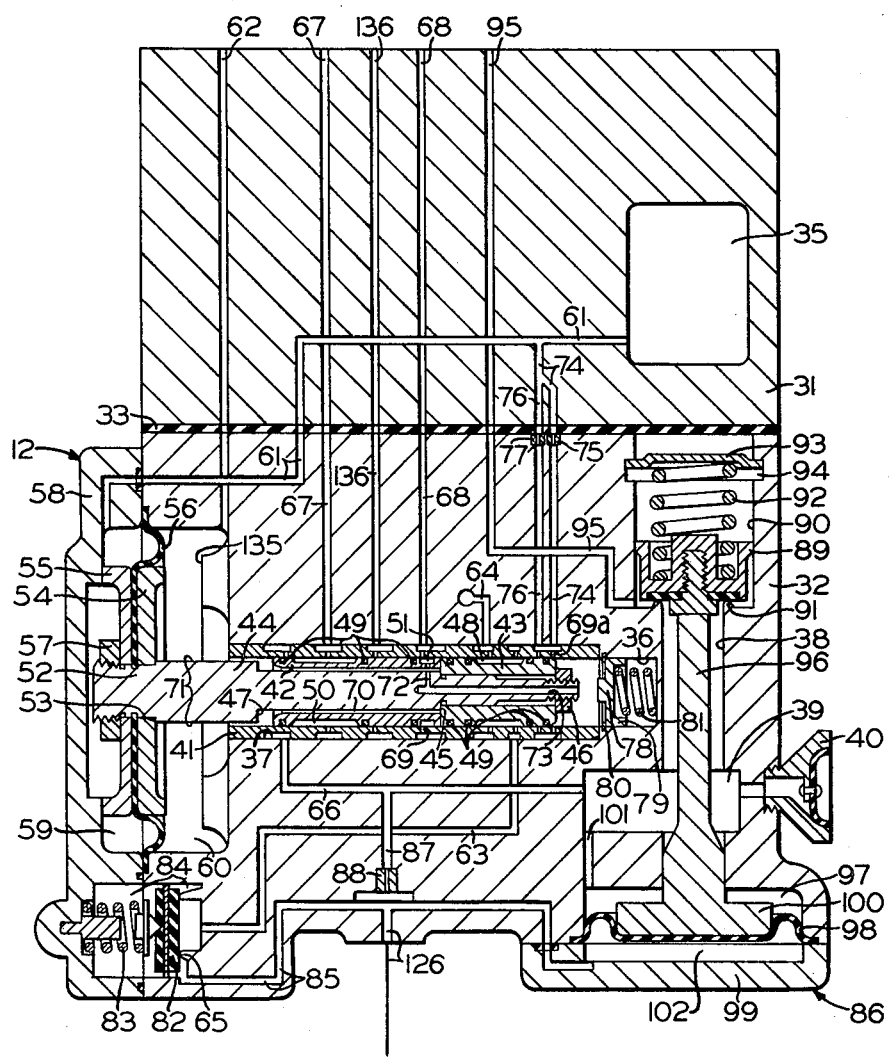
FIG. 2 is a diagrammatic view on an enlarged scale of an emergency valve device shown in outline in FIG. 1.

As shown in FIG. 2 of the drawings, emergency valve 12 comprises a sectionalized casing having a pair of casing sections 31 and 32 that are secured together by any suitable means (not shown), there being a resilient gasket 33 interposed therebetween. The casing section 31 is secured to the lower face 11 (FIG. 1) of the pipe bracket 8 by any suitable means (not shown), there being a gasket 34 interposed between the lower face 11 and the upper end of the casing section 31 that has formed therein a quick action chamber or volume 35.

As shown in FIG. 2 of the drawings, the casing section 32 is provided with a bottomed bore 36, a coaxial counterbore 37, a bore 38 the axis of which forms a right angle with the axis of the bottomed bore 36 and an exhaust chamber 39 located intermediate the ends of the bore 38. An insect excluder device 40 carried by the casing section 32 prevents the entrance of insects such as, for example, mud wasp, into the exhaust chamber 39.

As shown in FIG. 2, a grooved, ported bushing 41 is pressed into the counterbore 37. Slidably mounted in the ported bushing 41 is a pair of annular tandem-arranged spool-type valves 42 and 43. Extending through these spool-type valves 42 and 43 is a valve operating stem 44 that has a first shoulder 45 against which the left-hand end of the annular spool-type valve 43 is forced by a nut 46 that has screw threaded engagement with external screw threads provided therefor on the right-hand end of this valve stem 44.

In order to provide for a limited lost-motion connection between the valve stem 44 and the annular spool-type valve 42, the valve stem 44 is provided with a second shoulder 47 that is spaced from the first shoulder 45 a distance that is somewhat greater than the length of the valve 42. It will be understood that the inside diameter of the annular spool-type valve 42 is of sufficient size as to provide an appreciable annular clearance between this valve 42 and the valve stem 44.

As shown in FIG. 2, the spool-type valve 43 is provided with an elongated peripheral annular groove 48 at each end of which is a pair of spaced-apart peripheral annular grooves in each of which is carried an O-ring seal 49 that forms a seal with the wall surface of the bushing 41.

Likewise, the spool-type valve 42 is provided with two spaced-apart elongated grooves 50 and 51 and three peripheral annular grooves in each of which is carried an O-ring seal 49, it being noted from FIG. 2 that two of these O-ring seals 49 are located adjacent the respective opposite ends of the elongated peripheral annular groove 50, and that the third one of these O-ring seals 49 is located adjacent the left-hand end of the elongated peripheral annular groove 51.

The valve operating stem 44 has adjacent its left-hand end a portion 52 of reduced diameter to form a third shoulder 53 against which rests an annular diaphragm follower 54 between which and an annular diaphragm follower plate 55 is clamped the inner periphery of an annular flexible diaphragm 56 by a nut 57 that has screw-threaded engagement with external screw threads provided therefor on the portion 52 of the valve operating stem 44 adjacent the end of this portion 52.

The outer periphery of the diaphragm 56 is clamped between the left-hand end of the casing section 32 and a cover member 58 that is secured to this casing section 32 by any suitable means (not shown).

The diaphragm 56 cooperates with the casing section 32 and cover member 58 to form on the respective opposite sides of this diaphragm a pair of chambers 59 and 60. The chamber 59 on the left-hand side of the diaphragm 56 is connected by a passageway 61 extending through the casing sections 32 and 31 to the hereinbefore-mentioned quick action chamber 35 formed in the casing section 31, and the chamber 60 on the right-hand side of this diaphragm is connected to the brake pipe 1 by a passageway 62 that extends through the casing sections 32 and 31 and registers with one end of the passageway 14 in the pipe bracket 8, this passageway and corresponding port 14 and the branch pipe 19.

While the valve operating stem 44, the spool-type valves 42 and 43 and the diaphragm 56 occupy the position shown in FIG. 2 in which the diaphragm follower plate 55 abuts the cover member 58, the groove 48 on the valve 43 establishes via ports in the bushing 41 a communication between one end of a passageway 63 in the casing section 32 that opens at the wall surface of the counterbore 37 and one end of a passageway 64 that also opens at the wall surface of this counterbore. The passageway 63 extends through the casing section 32 and has formed at its other end an annular valve seat 65, and the passageway 64 extends through this casing section 32 to the exterior thereof whereby this passageway 64 constitutes an exhaust passageway through which fluid under pressure is released to atmosphere from the passageway 63 while the spool-type valve 43 occupies the position shown in FIG. 2.

Moreover, while the spool-type valve 42 occupies the position shown in FIG. 2 of the drawings, the groove 50 thereon establishes via ports in bushing 41 a communication between one end of a passageway 66 in the casing section 32 that opens at the wall surface of the counterbore 37 near the left-hand end of this counterbore and one end of another passageway 67 in this casing section that opens at the wall surface of this counterbore 37 at a location that is diametrically opposite and slightly to the right of the location at which the one end of the passageway 66 opens at this wall surface. The passageway 66 extends through the casing section 32 and at its opposite end opens into the hereinbefore-mentioned exhaust chamber 39, and the passageway 67 extends through the casing sections 32 and 31 and the pipe bracket 8 (FIG. 1) to the relay valve device 13 hereinafter described in detail.

Furthermore, while the valve 42 occupies the position shown in FIG. 2 of the drawing, the groove 51 thereon registers via a port in the bushing 41 with one end of a passageway 68 that extends through the casing sections 32 and 31 and the pipe bracket 8 (FIG. 1) and at its other end opens into the passageway 15 in this pipe bracket intermediate the ends of the passageway 15 which is connected by the pipe 20 to the main reservoir 2.

Finally, the annular spool-type valve 42 is provided with a crossbore 69 that at one end opens at the bottom of the elongated peripheral annular groove 51 on this valve 42 and at the other end opens at the interior wall surface of this annular valve 42. Thus, while the valve 42 occupies the position shown in FIG. 2, the crossbore 69, in cooperation with the annular groove 51 on this valve 42 and ports in the ported bushing 41 which are in alignment with the groove 51, enable fluid under pressure to flow from the passageway 68, which is connected to the main reservoir 2 as explained above, to the annular clearance 70 between the interior of this valve 42 and the outside surface of that portion of the valve stem 44 extending through this valve 42.

Fluid under pressure thus supplied to the annular clearance 70 may flow therefrom to the chamber 60, via the interior of the bushing 41 and the space provided between the wall surface of this bushing 41 and a pair of flat surfaces 71 on stem 44, and thence to the brake pipe 1 (FIG. 1), via passageway 62 (FIG. 2), passageway and port 14 (FIG. 1) and branch pipe 19, until the brake pipe 1 is charged to the pressure carried in the main reservoir 2.

Also, while the valves 42 and 43 occupy the position shown in FIG. 2, fluid under pressure supplied to the annular clearance 70 may flow therefrom to the right-hand end of the counterbore 37 via a crossbore 72 and a bottomed bore 73 in the valve stem 44.

Moreover, while the valve 43 occupies the position shown in FIG. 2, the O-ring seal 49 carried thereon adjacent its right-hand end forms a seal with the wall surface of the bushing 41 at a location that is on the left-hand side of the location at which one end of a passageway 74 opens at the wall surface of the counterbore. This passageway 74 extends through the casing sections 32 and 31 and at its opposite end opens into the hereinbefore-mentioned passageway 61. Disposed in this passageway 74 is a restriction or choke 75 the size of which determines the rate at which fluid under pressure may flow to and from the quick action chamber 35 and the chamber 59.

As shown in FIG. 2, a passageway 76 extending through the casing sections 31 and 32 opens at one end into the passageway 74 on the quick action chamber side of the choke 75 and at the other end at the wall surface of the counterbore 37 at a location that is at the left-hand side of the location at which the one end of the passageway 74 opens at this wall surface. This passageway 76 has a choke 77 disposed therein the diameter of which is less than the diameter of the choke 75. This other end of the passageway 76 is so located that, when the valve operating stem 44 and the spool-type valve 43 are moved in the direction of the right hand, as viewed in FIG. 2, until the right-hand end of this stem 44 abuts a spring-biased stop in the form of a plunger 78 that has a collar 79 which is normally biased against a snap ring 80 by a spring 81, the groove 48 on the valve 43 establishes via ports in bushing 41 a communication between the passageway 76 having the choke 77 therein and the exhaust passageway 64. The size of the choke 77 is such that when the groove 48 establishes communication between this passageway 76 and the exhaust passageway 64, fluid under pressure will flow from the chamber 59 and the quick action chamber 35 to atmosphere at a service rate of brake pipe reduction via passageways 61, 74 and 76, choke 77, ports in bushing 41, groove 48 on valve 43 and exhaust passageway 64. Therefore, an undesired emergency brake application is not effected by brake pipe leakage at a rate less than an emergency rate.

It will be noted from FIG. 2 of the drawings that the emergency valve device 12 embodies therein a flat disc check valve 82 that is normally biased against the hereinbefore-mentioned annular valve seat 65 by a spring 82 which is interposed between this valve 82 and the cover member 58.

While the disc valve 82 is seated on its seat 65, communication is closed between the passageway 63 and a chamber 84 into which opens one end of a passageway 85 that extends through the casing section 32 to a brake pipe vent valve device 86 that constitutes a part of the emergency valve device 12.

In order to provide for the release of fluid under pressure from this valve device 86 in a manner hereinafter described in detail, the passageway 85 is connected to the hereinbefore-mentioned passageway 66 by a passageway 87 that has disposed therein a choke 88 the size of which, prior to the present invention, determined the length of time that the vent valve device 86 remained open to vent fluid under pressure from the brake pipe 1 at an emergency rate upon the occurrence of an emergency brake application from any cause.

As shown in FIG. 2 of the drawings, the brake pipe vent valve device 86 comprises a cup-shaped vent valve 89 that is slidably mounted in a counterbore 90 that is coaxial with the hereinbefore-mentioned bore 38 in the casing section 32 and normally biased against an annular valve seat 91 formed at the upper end of the bore 38 by a spring 92 that is interposed between the vent valve 89 and an annular spring seat 93 the periphery of which is disposed in an annular groove 94 formed in the wall surface of the counterbore 90.

Opening into the lower end of the counterbore 90 on the outside of the valve seat 91 is one end of a passageway 95 that extends through the casing sections 32 and 31 and the pipe bracket 8 (FIG. 1) and at its other end opens into the passageway 14 intermediate the ends thereof.

In order to effect unseating of the vent valve 89 (FIG. 2) from its seat 91, a valve operating stem 96 extends through the bore 38 and the exhaust chamber 39 to a chamber 97 above a diaphragm 98 that has its outer periphery clamped between the lower end of the casing section 32 and a lower cover member 99 that is secured to the casing section 32 by any suitable means (not shown). Formed integral with the lower end of the stem 96 is a diaphragm follower 100 that is disposed in the chamber 97 and in abutting relationship with the upper side of the diaphragm 98.

The chamber 97 above the diaphragm 98 is connected to the exhaust chamber 39 by a passageway 101, and the hereinbefore-mentioned passageway 85 opens into a chamber 102 formed on the lower side of the diaphragm 98 by the cooperative relationship of this diaphragm and the lower cover member 99.

As shown in FIG. 1 of the drawings, the relay valve device 13 comprises a casing 103 that is secured to the lower face 11 of the pipe bracket 8 by any suitable means (not shown). This casing 103 cooperates with an end member 104 secured thereto by any suitable means (not shown) to form a supply chamber 105 into which opens one end of a passageway 106 that extends through the casing 103 and pipe bracket 8 and at its opposite end opens into the passageway 18 intermediate the ends thereof.

Extending through a bore 107 in the casing 103 is a hollow valve operating stem 108 having an exhaust valve seat 109 formed on its right-hand end. The left-hand end of the stem 108 is connected to a diaphragm 110 that cooperates with a cover member 111 to form a chamber 112 into which opens the hereinbefore-mentioned passageway 67.

When fluid under pressure is supplied to the chamber 112 via the passageway 67 in a manner hereinafter described, the diaphragm 110 shifts the stem 108 in the direction of the right hand to first move exhaust valve seat 109 into seating contact with a disc valve 113 to close communication between the brake cylinder 7 and an exhaust passageway 114 that extends through the casing 103 and registers with one end of the port and corresponding passageway 16 that extends through the pipe bracket 8 to the exterior surface thereof.

Further shifting of the stem 108 in the direction of the right hand effects unseating of the disc valve 113 from a supply valve seat 115.

When the valve 113 is thus unseated from the supply valve seat 115, fluid under pressure will flow from the supply reservoir 3 to the brake cylinder 7 via pipe 30, passageways 18 and 106, chamber 105, past unseated valve 113, bore 107, a passageway 116 that extends through the casing 103 and registers with one end of the passageway 17 in the pipe bracket 8, this passageway 17 and a correspondingly numbered pipe, one end of which is connected to the port 17 and the opposite end to the brake cylinder 7.

The fluid pressure operated release valve device 5 shown in FIG. 1 comprises a casing 117 and a cover member 118 between which is clamped the outer periphery of a flexible annular diaphragm 119 when the cover member 118 is secured to the casing 117 by any suitable means (not shown). This diaphragm 119 cooperates with the casing 117 and cover member 118 to form on the respective opposite sides of the diaphragm a pair of chambers 120 and 121, the chamber 120 being open to atmosphere via a short passageway 122 in the casing 117.

Disposed in the chamber 120 is an exhaust valve 123 for engagement with an annular valve seat 124 that surrounds the upper end of a passageway 125 extending through the casing 117 to the lower end thereof. Connected to the lower end of the passageway 125 is one end of a pipe 126 the opposite end of which is connected by a correspondingly numbered passageway to the hereinbefore-mentioned passageway 85 (FIG. 5) in the casing section 32 of the emergency valve device 12.

The valve 123 (FIG. 1) is secured to the lower screw-threaded end of a valve stem 127 by a nut 128. Adjacent its upper screw-threaded end, the valve stem 127 is provided with a shoulder 129 against which rests a diaphragm follower 130 between which and a diaphragm follower plate 131 the inner periphery of the diaphragm 119 is clamped by a nut 132.

Opening into the chamber 121 above the diaphragm 119 is a passageway 133 that is connected by a correspondingly numbered pipe to the hereinbefore-mentioned fluidic speedometer 6.

The fluidic speedometer 6 may be the same as that shown and described in U.S. Pat. No. 3,613,459 issued Oct. 19, 1971, to Ronald A. Sarback and assigned to the assignee of the present application. Therefore, a detailed description of this fluidic speedometer is deemed unnecessary. Briefly, however, as explained in the above-mentioned United States patent, the fluidic speedometer 6 is operative, while the vehicle provided therewith is in motion, to provide in the pipe 133 and, therefore, in the chamber 121, fluid at a pressure proportional to the speed of the vehicle. Accordingly, so long as the vehicle is in motion, the fluid under pressure supplied to the chamber 121 acts on the effective area of the upper side of the diaphragm 119 to transmit a force through the valve stem 127 to maintain the valve 123 seated on its seat 124. Therefore, when the vehicle comes to a stop, fluid under pressure is no longer supplied to the chamber 121. Accordingly, it is apparent that with no fluid under pressure present in the chamber 121, any fluid under pressure present in the pipe 126 and passageway 125 will unseat valve 123 from its seat 124 and flow to atmosphere via chamber 120 and the short passageway 122.

Furthermore, as explained in the above-mentioned U.S. Pat. No. 3,613,459, the fluidic speedometer 6 is provided with a pressure gage 134 that may be calibrated in miles per hour.

OPERATION

To initially charge the brake control apparatus shown in FIG. 1, a diesel engine or an electric motor (not shown) is started for operating the fluid compressor 21 to effect charging of the main reservoir 2.

Fluid under pressure supplied to the main reservoir 2 will flow therefrom to the supply reservoir 3 to effect charging of this reservoir 3 via pipe 20, passageway 15 and 22, past valve 25, chamber 28, passageways 29 and 18 and pipe 30.

Moreover, fluid under pressure will flow from the main reservoir 2 to the brake pipe 1 via pipe 20, port and passageway 15, passageway 68, the corresponding groove and ports in the ported bushing 41 (FIG. 2), elongated peripheral annular groove 51 on and crossbore 69 in annular spool valve 42, annular clearance 70 between the interior wall surface of annular spool valve 42 and the exterior surface of valve operating stem 44, interior of bushing 41, clearance space between the wall surface of bushing 41 and the pair of flat surfaces 71 on valve stem 44, chamber 60, passageways 62 and 14 (FIG. 1) and branch pipe 19 until the brake pipe 2 is charged to the pressure carried in the main reservoir 2.

Some of the fluid under pressure supplied to the annular clearance 70 will flow to the quick action chamber 35 and chamber 59 at the left-hand side of the diaphragm 56 via the crossbore 72 and bottomed bore 73 in the valve operating stem 44, the interior of the bushing 41, a bore 69a in this bushing adjacent the right hand end thereof and the corresponding groove thereon, passageway 74, choke 75 and passageway 61 until the quick action chamber 35 and chamber 59 are charged to the pressure carried in the main reservoir 2.

From the foregoing, it is apparent that the chambers 59 and 60 on the opposite sides of the diaphragm 56 and the quick action chamber 35 are charged to the pressure carried in the main reservoir 2.

Now let it be supposed that an emergency brake application is effected by a reduction of the pressure in the brake pipe 1 (FIG. 1) at an emergency rate as the result of a break-in-two or some other cause.

When the pressure in the brake pipe 1 is reduced at an emergency rate, the pressure in the chamber 60 (FIG. 2) is likewise reduced at an emergency rate by flow of fluid under pressure from this chamber 60 to the brake pipe 1 via passageways 62 and 14 (FIG. 1) and branch pipe 19.

At this time the choke 75 (FIG. 2) restricts the rate at which fluid under pressure can flow from the quick action chamber 35 and the chamber 59 on the left-hand side of the diaphragm 56 to the chamber 60, via passageways 61 and 74, choke 75, bore 69a in and the corresponding groove on bushing 41, interior of right-hand end of this bushing 41, bottomed bore 73 and crossbore 72 in valve stem 44, annular clearance 70 between interior of annular valve 42 and stem 44, interior of bushing 41, clearance between interior wall surface of bushing 41 and the pair of flat surfaces 71 on stem 44, chamber 60, and thence to the brake pipe 1 via the pathway described above. Consequently, the pressure in the chamber 60 reduces faster than the pressure in the chamber 59 thereby quickly establishing a differential fluid pressure force on the diaphragm 56 which acts in the direction to shift the stem 44 and valve 43 relative to the valve 42 until the shoulder 47 on the stem 44 abuts the left-hand end of the valve 42. Thereafter, the differential fluid pressure force acting on the diaphragm 56 is effective to shift the stem 44 and valves 42 and 43 in the direction of the right hand, as viewed in FIG. 2, against the yielding resistance of the spring 81 until the diaphragm follower 54 abuts a stop surface 135 on the casing section 32.

In this position of the valve 42, the groove 50 thereon establishes a communication, via ports in the ported bushing 41, between the one end of the passageway 67 and one end of a passageway 136, that extends through the casing sections 32 and 31 and the pipe bracket 8 (FIG. 1) and opens at its other end into the passageway 18 intermediate the ends thereof.

Therefore, fluid under pressure will now flow from the supply reservoir 3 to the chamber 112 in the relay valve device 13 via pipe 30, port and passageway 18, passageway 136, a groove on and corresponding ports in bushing 41, groove 50 (FIG. 2) on valve 42 and passageway 67.

Fluid under pressure thus supplied to the chamber 112 (FIG. 1) will deflect the diaphragm 110 in the direction to shift the valve stem 108 in the direction of the right-hand, as viewed in FIG. 1, until the exhaust valve seat 109 is seated on the left-hand side of the disc valve 113 thereby closing communication between the brake cylinder 7 and atmosphere.

Further deflection of the diaphragm 110 will now shift the stem 108 in the direction of the right-hand to effect unseating of valve 113 from supply valve seat 115.

Upon the unseating of valve 113 from the supply valve seat 115, fluid under pressure will flow from the supply reservoir 3 to the brake cylinder 7 via pipe 30, port and passageway 18, passageway 106, chamber 105, past now unseated valve 113, bore 107, passageway 116, and passageway and pipe 17 to cause an emergency brake application on the vehicle, it being noted that some of the fluid under pressure supplied to the bore 107 flows to a chamber 137 at the right-hand side of the diaphragm 110 via a passageway 138 to cause the self-lapping operation of the relay valve device 13.

The fluid under pressure thus supplied to the brake cylinder 7 on each vehicle in a train will force brake shoes (not shown) against the tread surface of the wheels (not shown) of all the vehicles in the train to bring the train to a stop.

Referring to FIG. 2 of the drawings, when the valves 42 and 43 are shifted in the direction of the right-hand by the deflection of the diaphragm 56 until the diaphragm follower 54 abuts the stop surface 135 on the casing 32, the groove 48 on the valve 43 will establish, via ports in the ported bushing 41, a communication between the passageways 74 and 63, whereupon fluid under pressure will flow from the quick action chamber 35 to the right-hand side of the valve 82 via passageways 61 and 74, choke 75, ports in the bushing 41, groove 48 on valve 43 and passageway 63. This fluid under pressure will now unseat valve 82 from its seat 65 and then flow to the chamber 102 below the diaphragm 98 of the brake pipe vent valve device 86 via chamber 84 and passageway 85.

Fluid under pressure thus supplied to the chamber 102 will deflect diaphragm 98 in the direction to shift diaphragm follower 100 and valve stem 96 upward to effect unseating of the vent valve 89 from its seat 91 against the yielding resistance of the spring 92.

Upon thus unseating vent valve 89 from its seat 91, fluid under pressure can flow from the brake pipe 1 (FIG. 1) to atmosphere at an emergency rate via branch pipe 19, port and passageway 14, passageway 95 (FIG. 2), counterbore 90, past unseated vent valve 89, bore 38, exhaust chamber 39 and insect excluder device 40.

It will be noted from FIG. 2 that the fluid under pressure supplied to the passageway 85 and chamber 102 can flow therefrom to atmosphere via the choke 88, passageways 87 and 66, exhaust chamber 39 and insect excluder device 40 at a rate determined by the size of the choke 88.

In emergency valve device 12 heretofore used in actual practice the sizes of the chokes 88 used have been such that the release of fluid under pressure from the chamber 102 to atmosphere was at such a rate that the brake pipe vent valve 89 was maintained unseated from a minimum of fifteen seconds to a maximum of thirty seconds.

Accordingly, it is apparent that the size of the choke 88 used in the respective emergency valve device 12 determined the length of time between the occurrence of an emergency brake application on the vehicles in a train and provided with this emergency valve device 12 and a subsequent release of this brake application. Thus, if a train, each car of which is provided with an emergency valve device 12, is brought to a stop prior to the release of all fluid under pressure from the chamber 102 in the emergency valve device 12 on each respective car in the train, the train would remain stopped with an emergency brake application in effect on each car until all the fluid under pressure in the chamber 102 of the emergency valve device 12 on each car is released to atmosphere via the choke 88 of the respective emergency valve device 12.

Considering now the present invention, it will be noted from FIG. 2 that the fluid under pressure supplied to the passageway 85 and chamber 102 also flows to the passageway 125 (FIG. 1) and the lower side of the exhaust valve 123 of the fluid pressure operated release valve device 5 via the passageway and pipe 126. However, as long as fluid under pressure is present in the chamber 121 above the diaphragm 119, this fluid under pressure will transmit a force to the exhaust valve 123 via the stem 127 to maintain this valve 123 seated on its seat 124.

As train speed is reduced and the train brought to a stop, as the result of the above-described emergency brake application, the fluidic speedometer 6 operates to correspondingly reduce the pressure in the pipe and passageway 133 and the chamber 121 above the diaphragm 119 of the fluid pressure operated release valve device 5. Therefore, as the train is brought to a stop, the pressure in the chamber 121 is reduced to atmospheric pressure.

Accordingly, it is apparent that when the pressure in the chamber 121 is reduced to atmospheric pressure, if pressure of the fluid in the passageway 125 and pipe and passageway 126 has not been reduced to atmospheric pressure by flow to atmosphere via the choke 88 (FIG. 2), this pressure in the passageway 125 (FIG. 1) will unseat exhaust valve 123 from its seat 124.

When exhaust valve 123 is thus unseated from its seat 124, the fluid under pressure in the chamber 102 (FIG. 2) below the diaphragm 98 of the brake pipe vent device 86 will flow to atmosphere at an unrestricted rate via passageway 85, passageway and pipe 126, passageway 125 (FIG. 1), past unseated exhaust valve 123, chamber 120 and short passageway 122.

It will be understood that at this time fluid under pressure is also flowing from the chamber 102 to atmosphere via passageway 85, choke 88, passageways 87 and 66, exhaust chamber 39, and insect excluder device 40.

From the foregoing, it is apparent that, upon the train being brought to a complete stop, fluid under pressure in the chamber 102 of the brake pipe vent valve device 86 on each car in the train is quickly reduced to atmosphere whereupon the spring 92 seats the brake pipe vent valve 89 of each vent valve device 86 on its corresponding seat 91 to thereby prevent flow of fluid under pressure from the brake pipe 1 to atmosphere at an emergency rate via the vent valve device 86 of the emergency valve device 12 on each car.

When the brake pipe vent valve 89 of the brake pipe vent valve device 86 on each car in the train is thus reseated on its corresponding valve seat 91, the brake pipe 1 can be recharged and the emergency brake application on the train released in the manner now to be explained.

Subsequent to the stopping of the train and the reseating of the brake pipe vent valve 89 of the emergency valve device 12 on each car in the train, fluid under pressure is supplied to the brake pipe 1 by such as a brake valve device located on the locomotive hauling the train or on a self-propelled vehicle that is provided with the brake apparatus constituting the present invention.

Referring to FIG. 1, when fluid under pressure is supplied to the brake pipe 1 to effect the recharging thereof, this fluid under pressure will flow from the brake pipe 1 to the chamber 60 (FIG. 2) on the right-hand side of the diaphragm 56 of the emergency valve device 12 on each car in the train via branch pipe 19 (FIG. 1), port and passageway 14, and passageway 62 (FIG. 2).

With the spool valves 42 and 43 in their emergency position, the groove 48 on the spool valve 43 establishes a communication between passageways 74 and 63 in the manner hereinbefore explained. Therefore, fluid under pressure cannot flow from the chamber 60 to the quick action chamber 35 and chamber 59 on the left-hand side of the diaphragm 56. Consequently, the pressure in the chamber 60 will increase as the result of the flow of fluid under pressure thereto from the brake pipe 1. Therefore, this increase of pressure of fluid in the chamber 60 will quickly establish a sufficient differential fluid pressure force on the diaphragm 56 which acts in the direction of the left-hand, as viewed in FIG. 2, to first effect shifting of the valve 43 in the direction of the left-hand until the left-hand end of this valve 43 abuts the right-hand end of the valve 42 and thereafter shifting of the valve 42 and also the valve 43 in the direction of the left-hand until the diaphragm follower plate 55 abuts the cover member 58 and the valves 42 and 43 are returned to the position in which they are shown in FIG. 2.

When the spool valve 42 is thus returned to the position shown in FIG. 2, fluid under pressure in the chamber 112 (FIG. 1) of the relay valve device 13 will flow to atmosphere via passageway 67 (FIG. 2), grooves on and ports in the ported bushing 41, groove 50 on valve 42, passageway 66, exhaust chamber 39 and insect excluder device 40.

As fluid under pressure is thus released from the chamber 112 (FIG. 1) of the relay valve device 13 on each car in the train, the fluid under pressure in the chamber 137 of each valve device 13 will deflect the corresponding diaphragm 110 in the direction of the left-hand, as viewed in FIG. 1, to return the valve stem 108 to the position shown whereupon the valve 113 is reseated on the supply valve seat 115 by a spring 139 and the exhaust valve seat 109 is moved out of seating contact with the left-hand side of the valve 113.

Fluid under pressure will now flow from the brake cylinder 7 on each car in the train to atmosphere via the pipe and passageway 17, passageway 116 in the corresponding relay valve device 13, bore 107, hollow valve stem 108, passageway 114 and passageway and port 16 to thereby release the previously effected emergency brake application on each respective car in the train.

From the foregoing, it is apparent that the fluid pressure operated release valve device 5 and the fluidic speedometer 6 provided by the present invention enables an emergency brake application to be released on a train as soon as the train is brought to a stop.

Having now described the invention what I claim as new and desire to secure by Letters Patent, is:

1. For use with a vehicle brake apparatus having a brake applying means and a normally charged brake pipe, variations of the pressure in said pipe cause said brake applying means to effect a brake application and a subsequent brake release, the combination of:
   a. brake pipe vent valve means operable to release fluid under pressure from the brake pipe at an emergency rate,
   b. emergency valve means responsive to a reduction of pressure in the brake pipe at only an emergency rate to simultaneously cause operation of the brake applying means to effect a brake application and said vent valve means to release fluid under pressure from the brake pipe, wherein the improvement comprises:
   fluid pressure operable means responsive to the absence of the supply of fluid under pressure thereto to cause said vent valve means to terminate the release of fluid under pressure from the brake pipe at an emergency rate, and
   d. means operable to supply fluid to said fluid pressure operable means at a pressure proportional to the speed of the vehicle whereby said vent valve means terminates the release of fluid under pressure from the brake pipe upon stopping of the vehicle.

2. The combination, as recited in claim 1, further characterized in that said brake pipe vent valve means is operable in response to the supply of fluid under pressure thereto, and said fluid pressure operable means in the absence of the supply of fluid under pressure thereto effects the release of fluid under pressure from said vent valve means to cause said vent valve means to terminate the release of fluid under pressure from the brake pipe.

3. The combination, as recited in claim 2, further characterized by means operable independently of said fluid pressure operable means to effect the release of fluid under pressure from said vent valve means to atmosphere.

4. The combination, as recited in claim 2, further characterized by means operable independently of and prior to the operation of said fluid pressure operable means to effect the release of fluid under pressure from said vent valve means to atmosphere.

5. The combination, as recited in claim 2, further characterized by means operable independently of said fluid pressure operable means to effect the release of fluid under pressure from said vent valve means to atmosphere a preselected controlled rate.

6. The combination, as recited in claim 2, further characterized by means operable independently of and prior to the operation of said fluid pressure operable means to effect the release of fluid under pressure from said vent valve means to atmosphere at a preselected controlled rate.

7. The combination, as recited in claim 1, further characterized in that said means operable to supply fluid to said fluid pressure operable means at a pressure proportional to the speed of the vehicle comprises a fluidic speedometer.

8. For use with a vehicle brake apparatus having a brake applying means, a supply reservoir, a fluid pressure supply pipe, a one-way flow valve means enabling charging of the supply reservoir from the supply pipe, a relay valve device operable by fluid under pressure to effect the supply of fluid under pressure from the supply reservoir to the brake applying means to cause a brake application on the vehicle, and a normally charged brake pipe, the combination of:

a. an emergency valve device having:
  i. a quick action chamber,
  ii. a fluid pressure operated brake pipe vent valve device operable to provide for flow of fluid under pressure from the brake pipe at an emergency rate, and
  iii. fluid pressure operated valve means operably responsive to the charging of said brake pipe to effect the supply of fluid under pressure from the brake pipe to said quick action chamber to effect charging of said chamber to the pressure carried in the brake pipe, and operably responsive to a reduction of pressure in the brake pipe at only an emergency rate to simultaneously cause the relay valve device to effect the supply of fluid under pressure from the supply reservoir to the brake applying means and the flow of fluid under pressure from said quick action chamber to said fluid pressure operated brake pipe vent valve device to cause operation thereof, wherein the improvement comprises:
b. fluid pressure operated release valve means operable in the absence of the supply of fluid under pressure thereto to release fluid under pressure from said vent valve device to atmosphere, and
c. speed responsive means operable to supply fluid to said fluid pressure operated release valve means at a pressure proportional to the speed of the vehicle whereby stopping of the vehicle enables said brake pipe vent valve device to be operated to prevent flow of fluid under pressure from said brake pipe thereby enabling a brake release.

9. The combination, as recited in claim 8, further characterized in that said emergency valve device has means operable independently of said fluid pressure operated release valve means to release fluid under pressure from said fluid pressure operated brake pipe vent valve device to atmosphere at a controlled rate whereby said brake pipe vent valve device is operable to prevent flow of fluid under pressure from the brake pipe at an emergency rate notwithstanding failure of said fluid pressure operated release valve means to release fluid under pressure from said fluid pressure operated brake pipe vent valve device upon stopping of the vehicle.

10. The combination, as recited in claim 9, further characterized in that said independent means for releasing fluid under pressure from said fluid pressure operated brake pipe vent valve device is of such size as to insure that, upon failure of said fluid pressure operated release valve means to release fluid under pressure from said brake pipe vent valve device to atmosphere, said brake pipe vent valve device terminates venting of fluid under pressure from the brake pipe only subsequent to stopping of the vehicle even though the speed and weight of the vehicle are the maximum allowable for safe operation.

11. The combination, as recited in claim 9, further characterized in that said independent means and said fluid pressure operated release valve means for releasing fluid under pressure from said fluid pressure operated brake pipe vent valve device are so arranged as to provide for the release of fluid under pressure from said brake pipe vent valve device through two separate paths, one of which has said independent means disposed therein, and the other of which has said fluid pressure operated release valve means disposed therein.

12. The combination, as recited in claim 8, further characterized in that said fluid pressure operated release valve means comprises:

a. an annular exhaust valve seat,
b. a disc valve for engagement with said exhaust valve seat,
c. a movable abutment subject on one side thereof to fluid under pressure supplied by said speed responsive means, and
d. means connecting said disc valve to the other side of said abutment whereby said disc valve is maintained in seating contact with said annular exhaust valve seat so long as said speed responsive means supplies fluid under pressure to said one side of said abutment.

* * * * *